No. 762,404. PATENTED JUNE 14, 1904.
P. HANSON.
KNOTTER MECHANISM FOR GRAIN BINDERS.
APPLICATION FILED JULY 9, 1903.
NO MODEL. 6 SHEETS—SHEET 1.

Witnesses: Inventor:
Paul Hanson
by Brown & Darby
Attorneys.

No. 762,404. PATENTED JUNE 14, 1904.
P. HANSON.
KNOTTER MECHANISM FOR GRAIN BINDERS.
APPLICATION FILED JULY 9, 1903.
NO MODEL. 6 SHEETS—SHEET 2.

Witnesses:
C. H. Seem
E. C. Semple

Inventor:
Paul Hanson
by Brown & Darby
Attorneys.

No. 762,404. PATENTED JUNE 14, 1904.
P. HANSON.
KNOTTER MECHANISM FOR GRAIN BINDERS.
APPLICATION FILED JULY 9, 1903.
NO MODEL. 6 SHEETS—SHEET 4.

No. 762,404. PATENTED JUNE 14, 1904.
P. HANSON.
KNOTTER MECHANISM FOR GRAIN BINDERS.
APPLICATION FILED JULY 9, 1903.
NO MODEL. 6 SHEETS—SHEET 5.

Witnesses:
C. H. Seem
E. C. Semple

Inventor:
Paul Hanson
by Brown & Darby
Attorneys

No. 762,404. PATENTED JUNE 14, 1904.
P. HANSON.
KNOTTER MECHANISM FOR GRAIN BINDERS.
APPLICATION FILED JULY 9, 1903.
NO MODEL. 6 SHEETS—SHEET 6.

Witnesses:
C. H. Sem
E. C. Semple

Inventor.
Paul Hanson
by Brown & Darby
Attorneys.

No. 762,404. Patented June 14, 1904.

UNITED STATES PATENT OFFICE.

PAUL HANSON, OF ST. PAUL, MINNESOTA.

KNOTTER MECHANISM FOR GRAIN-BINDERS.

SPECIFICATION forming part of Letters Patent No. 762,404, dated June 14, 1904.

Application filed July 9, 1903. Serial No. 164,772. (No model.)

*To all whom it may concern:*

Be it known that I, PAUL HANSON, a citizen of the United States, residing at St. Paul, in the county of Ramsey and State of Minnesota, have invented a new and useful Knotter Mechanism for Grain-Binders, of which the following is a specification.

This invention relates to knotter mechanism for grain-binders, and is designed as an improvement upon the construction disclosed in my pending application, Serial No. 124,486, filed September 22, 1902.

The object of the invention is to simplify and improve the construction of knotter mechanism for grain-binders and to render the same more efficient in operation.

A further object of the invention is to provide means for efficiently stripping the formed knot from the knotter-bill after the knot has been tied and completed.

A further object of the invention is to provide means for efficiently guiding the twine into proper position in advance of the operation of the knotter-bill.

A further object of the invention is to improve the construction of cord holder and clamp to secure an efficient clamping action without danger of breaking the twine by leading or guiding the same over sharp corners or pinching the same between such corners.

A further object of the invention is to provide means for efficiently adjusting the tension of the spring which acts upon the cord-holder clamp.

Other objects of the invention will appear more fully hereinafter.

The invention consists, substantially, in the construction, combination, location, and relative arrangement of parts, all as will be more fully hereinafter set forth, as shown in the accompanying drawings, and finally pointed out in the appended claims.

Referring to the accompanying drawings, and to the various views and reference-signs appearing thereon.

The same part is designated by the same reference-sign wherever it occurs throughout the several views.

In the drawings reference-sign A designates the knotter-operating shaft, upon which are mounted the knotter-operating wheel B and the discharge-arms C; D, the knotter-frame, provided with a bearing for the knotter-operating shaft A; E, the knotter-bill-supporting frame, suitably hinged or pivoted upon the knotter-frame D—as, for instance, upon the pin F, journaled in bearings formed in the knotter-frame D; G, the knotter-bill shaft; H, the pinion for operating the same; J, the cutter-carrying arm, suitably hinged or pivoted in the knotter-frame; K, the breast-plate, having a slot or opening L therein, through which the needle operates.

The parts so far described may be of the usual or any suitable or convenient construction—such, for instance, as is set forth, described, and claimed in my pending application above referred to.

Figures 1, 2:
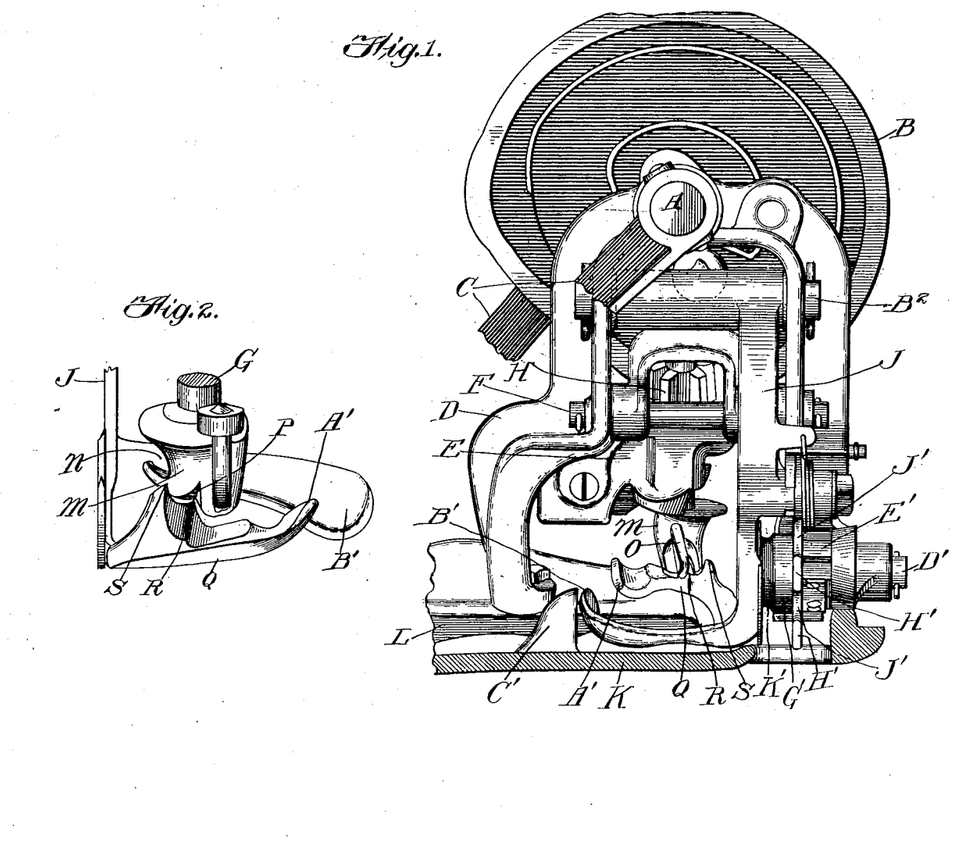
Figure 1 is a view in side elevation of a knot-tying mechanism, showing the application thereto of features of construction embraced within the scope of my invention.
Fig. 2 is a detached detail view, parts broken off, showing the knotter-bill and the stripper-plate and horn or finger and the tucker-finger and part of the knife-arm upon which said stripper-plate and horn are carried.
Figures 3, 4, 12:
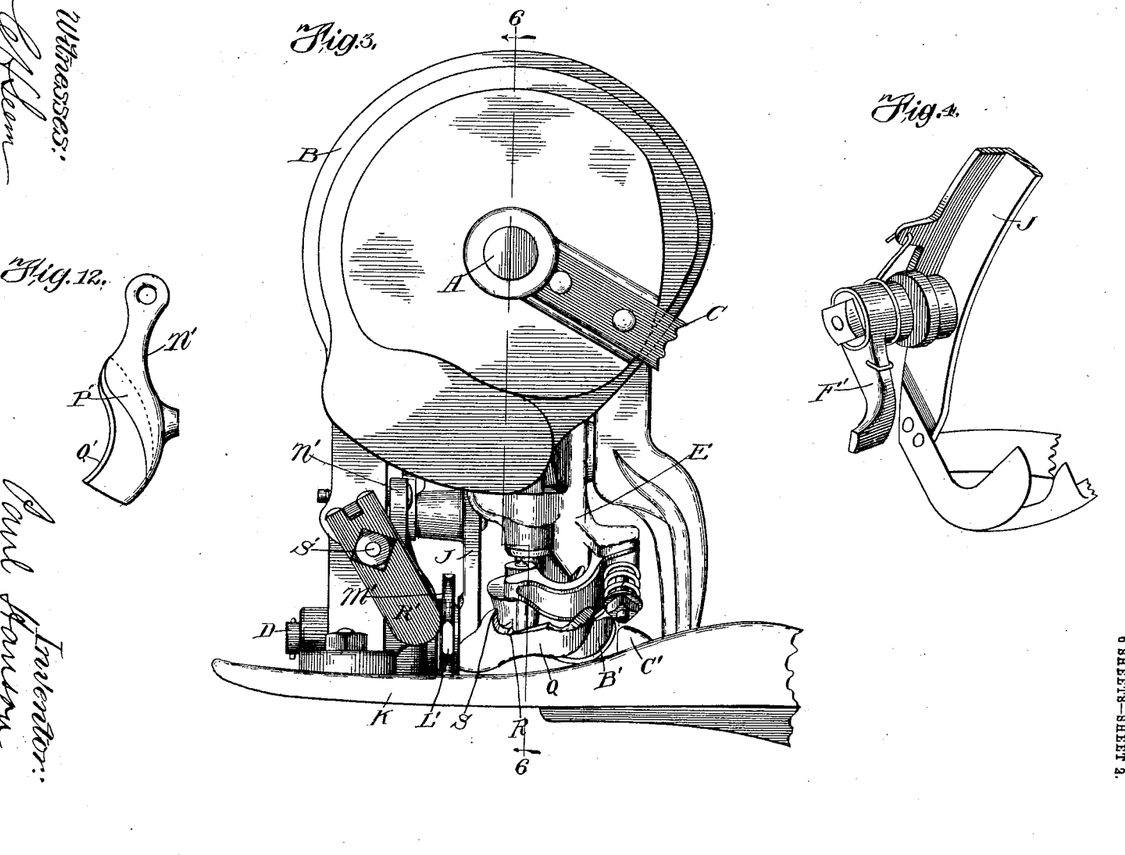
Fig. 3 is a view similar to Fig. 1, taken from the opposite side of the machine.
Fig. 4 is a detached detail view of the knife-arm, parts of the tucker and stripper-plate broken off and showing the arrangement of spring-pressed pawl for operating the cord-clamping block.
Fig. 12 is a detached detail view of the cord-clamping arm.
Figure 5:
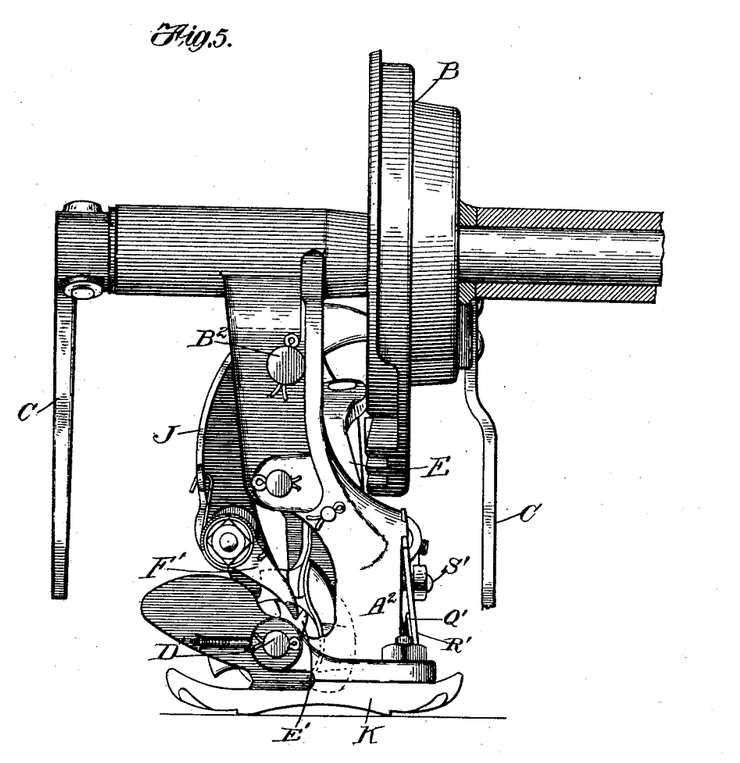
Fig. 5 is a view in rear elevation of the knot-tying mechanism embodying the principles of my invention.

After the operation of tying the knot it is desirable to insure the stripping of the knot from the knotter-bill. One of the special features of my invention is to provide means which are simple and efficient for accomplishing this purpose. In the construction shown embodying the principles of my invention the knotter-bill M is provided with a notch N in the toe thereof, with which coöperates the hooked end of the knotter-bill hook O. On the under side or surface of the knotter-bill M, I form a groove P, (see Fig. 2,) extending lengthwise of the knotter-bill or from the heel toward the toe thereof.

Q designates the stripper-plate, said plate being attached to or carried by the swinging knife-arm J. This stripper-plate Q is provided with a ridge R, in the upper surface thereof, arranged to operate or to slide through the notch or groove P in the bottom surface of the knotter-bill when the knife-arm is actuated in the proper cycle of operation of the knot-tying mechanism. The stripper-plate is also provided with a horn or finger S, arranged to slide along the side surface of the knotter-bill, the surface of the stripper-plate lying between the horn S and ridge R conforming to the exterior contour or surface of the knotter-bill and sliding therealong, thereby efficiently stripping the knot when formed from the knotter-bill. The stripper-plate Q is provided with an extension or finger A', which during the operation of stripping the knot from the knotter-bill serves the purpose of engaging the strand of twine which lies adjacent to the needle, thereby preventing such strand from slipping behind the stripper-plate.

It is also desirable in knot forming and tying mechanisms to insure the placing and guiding of the twine into efficient position to be engaged over the knotter-bill. It is among the purposes of my invention to provide means for accomplishing this purpose of crowding or deflecting the twine into proper position, so as to enable the knotter-bill to readily receive the same to form the initial twist therein in the process of forming the knot. This result is accomplished by means of the tucker-finger B', which is also mounted upon or formed with the knife-arm J and arranged to extend partially around the knotter-bill and to be projected across the line of the twine when the knife-arm J is rocked or swung in the operation of the apparatus, the end of such finger or horn engaging the twine and depressing or deflecting the same transversely across the slot L in the breast-plate and into position to engage over the knotter-bill. This tucker-finger is rounded at its end and in the swinging movements thereof coöperates with a lug or shoulder C', formed adjacent thereto on the breastplate, which thus acts as a stop to prevent the twine from following back with the tucker when said tucker is swung or moved back to normal position after having been projected across the slot L in the breastplate to perform its function of deflecting or carrying the twine into proper position to be engaged by the knotter-bill. In the operation of this part of my invention it will be understood that the end of the cord is clamped in the cord holder or clamping mechanism and extends therefrom to the eye of the needle and thence to the twine-can or other support for the cop or ball of twine. When the needle after being advanced to perform its work is retracted or occupies its retracted position, it lays the cord over the tucker-finger B'. The latter, however, by reason of the rocking movement imparted to the knife-arm J is withdrawn, so that its end will not extend over the slot L in the breast-plate. This withdrawing movement of the tucker enables the lug C' to form a stop for the twine to prevent the same from being withdrawn with the tucker, thereby permitting the twine extending from the cord-holder to the needle to be drawn down into the slot L of the breastplate and against the extreme rounded edge or end of the tucker, and hence into position to be engaged by the end surface of the tucker when the knife-arm is again swung inwardly toward the knotter-bill, thereby enabling the twine to be engaged by the under side of the end of the tucker and bent or deflected into proper position to be grasped or engaged by the knotter-bill. At its extreme limit of rocking movement the tucker-finger is carried over and across the slot in the breastplate and the lower edge of the tucker-finger pressing downwardly upon the twine, the twine leading from the cord-holder over the knotter-bill and thence under the lower edge of the tucker-finger, thus resulting in maintaining the twine in proper position to insure the proper tying of the knot by the operation of the knotter-bill. The knife-arm remains in its advanced position a sufficient length of time for the needle in its retracting movement to lay the twine over the tucker-finger, thereby forming a support therefor and preventing the twine from slipping underneath the knotter-bill. This is an advantageous feature in connection with a construction in which the knotter-bill is mounted in a swinging frame, said swinging frame mounted to rock or swing during the operation of stripping the knot from the knotter-bill. The support of the twine during such rocking or swinging movement of the knotter-bill frame upon the tucker-finger enables the twine to be maintained in proper position for the next succeeding knot to be tied. The advantage of this construction and operation just described will be seen when it is explained that the needle occasionally carries stems or stalks of grain with it when it advances to perform its work, which stems or stalks of grass being thus brought over or above the twine leading from the twine-holder depresses or pulls down the same, especially where such stems or stalks of grain become engaged with the bundle after it is formed or during the process of its formation, and consequently when the bundle is being ejected from the machine by the discharge-arm the pull exerted by the stems or stalks of grain attached to the bundle, and which have been carried up by the needle when advanced to its work to a position over the twine, pulls down that portion of the twine which extends from the eye of the needle to the cord-holder and out of efficient relation with respect to the knotter-bill. The objection resulting from this operation is remedied in the present case by providing the tucker-finger and arranging the same to be maintained in its position projected across the slot in the breastplate until the knotter-bill has been swung back into proper position to form the next knot. This tucker-finger also operates to efficiently press the twine into position against the shank of the knotter-bill and to hold the same there during the operation of the knotter-bill in forming the knot, and thereby preventing the knot from unduly slipping down toward the point of the knotter-bill while in process of formation.

Figure 11:
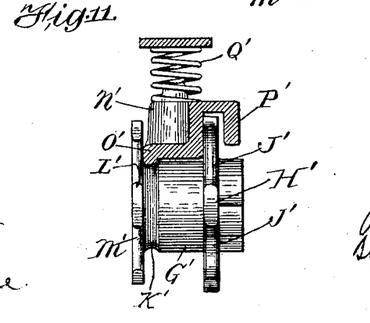
Fig. 11 is a detached detail view, parts in section, of the cord-holding mechanism.

The next feature of my invention to be described is the cord-holding mechanism. This comprises a rotary block carried upon a stud D', suitably journaled in bearings formed in the knotter-frame D. The cord-holder block carries or has connected or formed therewith a ratchet-wheel E', arranged to be engaged by a spring-pressed pawl F', pivotally mounted upon the knife-arm J, whereby upon each swinging movement of the knife-arm a step of rotary movement is imparted to the cord-holder block. The block comprises a cylindrical portion G', at one end of which is formed a flange having radiating teeth H' with intermediate seats or recesses J'. At its opposite end the cylindrical surface G' of the cord-holder block is provided with a shallow peripheral groove K'. (See Figs. 1 and 11.) This shallow groove is concaved in transverse section and at one edge thereof merges into the cylindrical surface of the block in such manner as to avoid the formation of a sharp ridge or shoulder. At its extreme inner end the cord-holder block is provided with a flange having teeth L' and intermediate seats M', similar to and corresponding with the teeth H' and seats J', formed in the flange at the opposite ends of such block.

N' designates the cord-clamping arm, arranged to be yieldingly pressed into engaging relation with respect to the cord-holder block. This clamp-arm is provided with a rib O', arranged to ride in and conforming in contour with the shallow peripheral groove K' in the cord-holder block. This clamp-arm is also provided with a flange P', arranged to engage over the flange in which are formed the teeth H' and seats J', thereby not only forming a guide for such flange, but also operating to enable the twine to be laid into proper position in the notches or seats of the cord-holder block when the needle begins its retracting movement after having been advanced, the edge of the flange P' preventing the twine from engaging over the tops or ends of the teeth H' and crowding the twine into or compelling it to be received and properly placed in the notches or seats in the cord-holder block. The bead or projection O' of the cord-holder clamp coöperating with the shallow groove K' serves to slightly crimp and to efficiently clamp, grip, and hold the twine in a most efficient manner at the point where the greatest pulling strain is exerted thereon, tending to withdraw the twine from the cord-holder. Thus it will be seen that I provide an exceedingly simple and efficient cord-clamping mechanism wherein the twine is efficiently laid or guided into proper place, and when rotary movement is imparted to the cord-holder block the twine so placed is carried in between the surface of the cord-holder block and the clamp-arm N', whereby it is efficiently clamped, gripped, or held and without being gripped or pinched between sharp edges or over sharp corners, shoulders, or surfaces. This is a particularly desirable feature where the knot-tying mechanism is employed in connection with grass binder-twine, while at the same time this construction is equally well adapted for ordinary Manila or other kinds of binder-twine.

Figure 6:
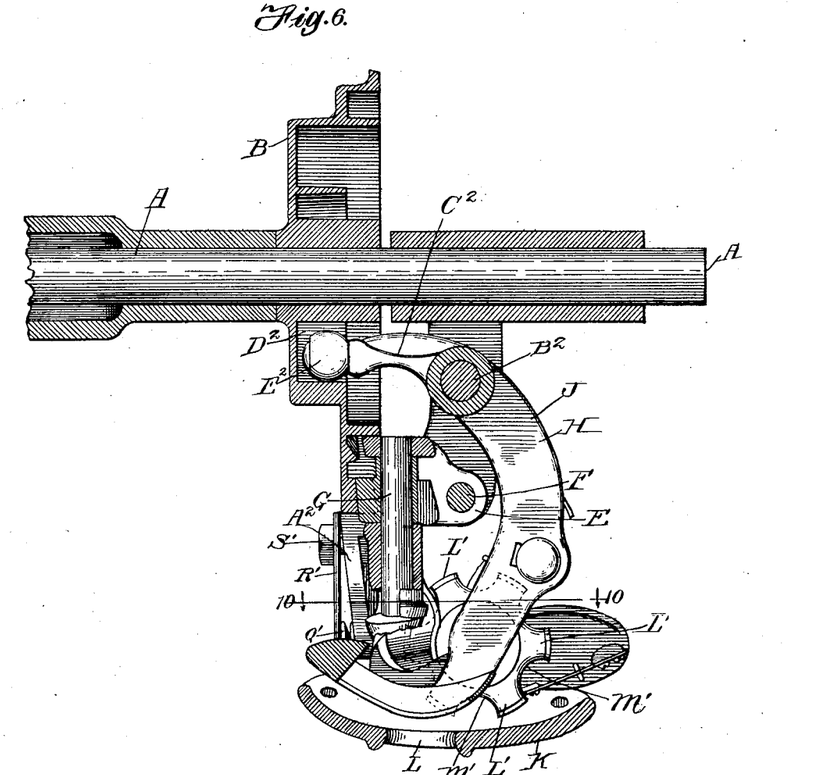
Fig. 6 is a view in section on the line 6 6, Fig. 3, looking in the direction of the arrows.
Figures 7, 8:
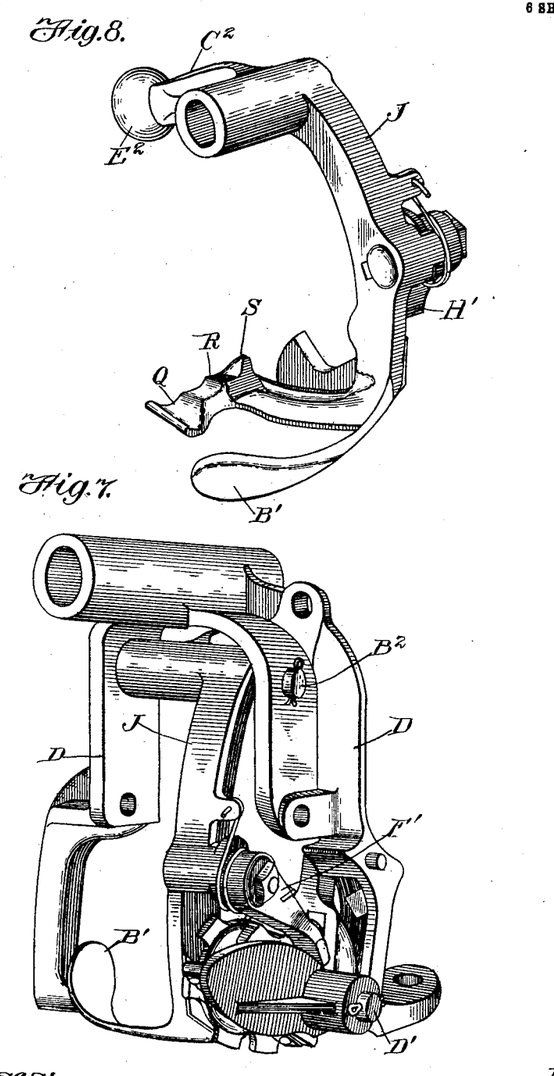
Fig. 7 is an enlarged detail view in perspective of the frame, showing the swinging knife-arm and cord holding or clamping mechanism, the knotter-bill and its supporting-frame being omitted.
Fig. 8 is a detached detail view in perspective of the swinging knife-arm carrying the stripper-plate and tucker.

The cord-clamping arm N' is yieldingly pressed into clamping relation with respect to the cord-holder block in any suitable or convenient manner—as, for instance, by means of a spring Q'. It is desirable that the tension of this spring be made adjustable. In the means heretofore employed for adjusting the tension of such spring the danger and objection are incurred of unduly increasing the tension exerted by said spring upon the cord-holder arm, especially where the adjustment is attempted to be made by a careless or unskilled operator. In order to avoid this objection, I provide a plate R' and loosely suspend the same upon the knotter-frame by means of an adjusting clamping bolt or stud S', and this plate takes the bearing for the adjusting-spring Q'. By turning up or backing off the adjusting screw or stud S' the loose plate R' may be clamped closer to or permitted a greater or wider range of movement from the knotter-frame, thereby adjusting the tension of the spring Q', but preventing undue compression of the tension of the spring Q' by coming in contact with the portion A² of the knotter-frame (see Fig. 6) before the limit of compression in the adjustment of the spring is attained, a sufficient range of adjusting movement of the plate R' before it engages the portion A² of the frame being permitted to secure the desired range of adjustment of the tension of spring Q' to accommodate the clamping-arm to various sizes or qualities of binder-twine.

Figure 9:
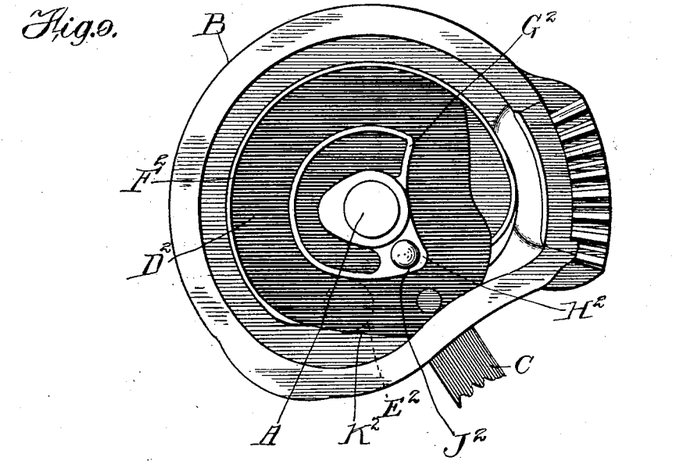
Fig. 9 is a detached detail face view of the knotter-operating wheel.
Figure 10:
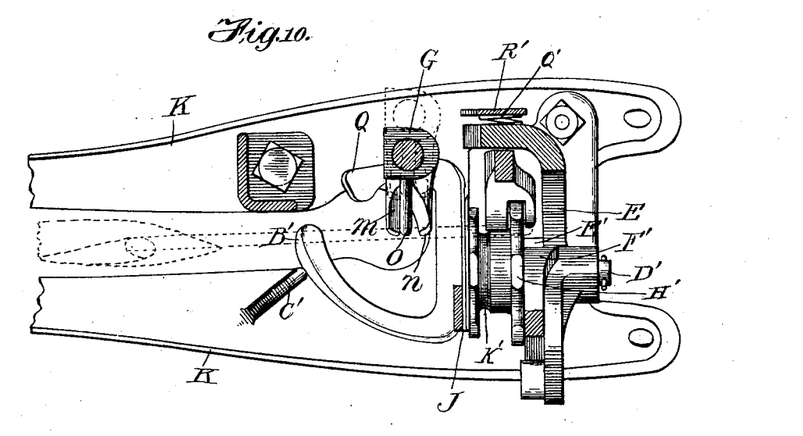
Fig. 10 is a view in horizontal section on the line 10 10, Fig. 6, looking in the direction of the arrows, parts of the breast-plate broken off.

I have above referred to the fact that the stripper-plate Q and tucker-finger B' are mounted upon or carried by the knife-arm J and that said knife-arm is mounted to rock or swing in a direction to carry said stripper-plate and tucker-finger transversely across the slot in the breast-plate. The knife-arm J is hinged or pivoted in any convenient manner—as, for instance, upon a pivot-stud B² in the knotter-frame—and is provided with an extension C² beyond such point of pivotal support, said extension projecting into a cam-groove D², formed in the face of the knotter-operating cam-wheel. If desired, this extension may be provided with an antifriction-roller E² to operate in said cam-groove. The cam F² operates to impart the rocking or swinging movement to the knife-arm, the part of the cam extending from the point G² to the point H² (see Fig. 9) operating to project the tucker-finger to its greatest extent transversely across the slot in the breast-plate and to withdraw the stripper-plate Q to its greatest extent from operative position. The point H² of the cam in the operation of the device is brought into engaging relation with respect to the roller E² of the knife-arm to withdraw the tucker-finger to its greatest extent and to advance the stripper-plate to perform its work. For a portion of its surface immediately adjacent the point H² the cam is provided with a substantially flat surface (indicated at J²) which, coöperating with the adjacent wall K² of the cam-slot, operates to impart a reverse movement to the knife-arm, thereby again projecting the tucker-finger out over and transversely across the slot in the breast-plate into position to form a delay-support for the twine when carried back by the needle and to prevent the same from being carried under the knotter-bill when the knotter-bill is again brought into position as above described.

Many variations and changes in the details of construction and arrangement would readily occur to persons skilled in the art and still fall within the spirit and scope of my invention. I do not desire, therefore, to be limited or restricted to the exact details shown and hereinabove set forth; but, Having now set forth the object and nature of my invention and a construction embodying the principles thereof, what I claim as new and useful and of my own invention, and desire to secure by Letters Patent, is—

1. In a knotter mechanism for grain-binders, a longitudinally-grooved knotter-bill, a stripper arranged to operate in such groove, means for moving said knotter-bill and stripper in opposite directions, and means for operating said knotter-bill, as and for the purpose set forth.

2. In a knotter mechanism for grain-binders, a knotter-bill, and means for operating the same, said bill having a longitudinal groove, in combination with a stripper-plate having a shoulder engaging said groove, and a finger or extension arranged to partially embrace the exterior surface of said knotter-bill, and means for relatively moving said knotter-bill and plate, as and for the purpose set forth.

3. In a knotter mechanism for grain-binders, a knotter-bill, and means for operating the same, in combination with a tucker-finger, means for projecting said tucker-finger past the knotter-bill to crowd or deflect and hold the twine in proper relation with respect to the bill, means for fully retracting said tucker-finger, and means for maintaining said tucker-finger in projected position to form a support for the twine to prevent the same from slipping under the knotter-bill, as and for the purpose set forth.

4. In a knotter mechanism for grain-binders, a knotter-bill, and means for operating the same, in combination with a tucker-finger, a cam for actuating said tucker-finger to project or withdraw the same into or out of coöperative relation with respect to said kotter-bill, said cam being formed to partially project said tucker-finger after the withdrawal thereof to enable said tucker-finger to form a support for the twine to prevent the same from slipping underneath the knotter-bill, as and for the purpose set forth.

5. In a knotter mechanism for grain-binders, a cord-holder including a block having a cylindrical surface and an adjacent shallow groove, in combination with a clamp-arm coöperating with said cylindrical surface, said arm having a clamping-rib conforming to the contour of and arranged to operate within said shallow groove, as and for the purpose set forth.

6. In a knotter mechanism for grain-binders, a cord-holder including a holder-block having a cylindrical surface and an adjacent shallow peripheral groove, said groove merging into said cylindrical surface, in combination with a clamp-arm having a surface coöperating with the cylindrical surface of said block, and a rib conforming to the contour of said peripheral groove, and means for yieldingly pressing said clamp-arm into engaging relation with respect to said block, as and for the purpose set forth.

7. In a knotter mechanism for grain-binders, a cord-holder including a holder-block having coöperating radiating teeth and notches or seats at the ends of said block, and an intermediate cylindrical surface, and a shallow peripheral groove adjacent to such cylindrical surface, and a clamp-arm coöperating with said cylindrical surface, and having a clamping-rib conforming to the contour of and arranged to coöperate with said shallow groove, as and for the purpose set forth.

8. In a knotter mechanism for grain-binders, a cord-holder including a holder-block having a cylindrical clamping-surface and an adjacent shallow peripheral groove, said block having notches or seats to receive the twine, a holder-clamp having a clamping-surface coöperating with the cylindrical surface of said block, and a rib coöperating with said shallow groove to crimp or grip the twine therein, said arm provided with a guide-flange to direct the twine into proper position in said notches or seats, and means for yieldingly pressing said clamp-arm into engaging relation with respect to said block, as and for the purpose set forth.

9. In a knotter mechanism for grain-binders, a cord-holder including a holder-block and a clamp-arm, means for yieldingly pressing said arm into engaging relation with said block, including a spring, a loose plate suspended upon the frame of the machine, and means for adjusting said plate toward and from engaging relation with respect to said frame to adjust the tension of said spring, whereby said spring is prevented from being unduly tightened, as and for the purpose set forth.

10. In a knotter mechanism for grain-binders, and in combination with a cord-holder including a clamp-block and a clamp-arm, a spring for pressing said arm into engaging relation with respect to said block, a plate loosely suspended upon the frame of the machine and arranged to engage said spring, and means for clamping said plate upon or away from the frame of the machine, whereby an undue tension of said spring is prevented, as and for the purpose set forth.

In witness whereof I have hereunto set my hand, this 3d day of July, 1903, in the presence of the subscribing witnesses.

PAUL HANSON.

Witnesses:
CHAS. H. SEEM,
S. E. DARBY.